United States Patent [19]

Shelstad

[11] 4,450,600
[45] May 29, 1984

[54] GANTRY WASHING DEVICE FOR TRACTOR-TRAILER TRUCKS

[76] Inventor: Richard J. Shelstad, 933 Heritage Ct., Mequon, Wis. 53092

[21] Appl. No.: 401,100

[22] Filed: Jul. 23, 1982

[51] Int. Cl.³ ............................................. B60S 3/06
[52] U.S. Cl. ............................... 15/53 A; 15/DIG. 2
[58] Field of Search ........... 15/53 A, 53 AB, DIG. 2, 15/97 R

[56] References Cited

U.S. PATENT DOCUMENTS 4,039,014  8/1977  Sellars ............................... 15/53 AB
4,306,325 12/1981  Pyle et al. ........................... 15/53 A Primary Examiner—Edward L. Roberts
Attorney, Agent, or Firm—Michael, Best & Friedrich

[57] ABSTRACT

The device for washing tractor-trailer truck units includes a gantry adapted to move over the unit, a pair of rotary, vertical, tractor brushes pivotally mounted on a front portion of the gantry for pivotal movement between a neutral position and a retracted position disposed laterally outwardly from the tractor-trailer unit, a pair of rotary, vertical, trailer brushes mounted on the rear portion of the gantry for pivotal movement between neutral and retracted positions, and a rotary, horizontal, top brush mounted on the gantry above the tractor-trailer unit for movement between an operating position and a retracted position. All the brushes are selectively pivoted to the retracted position by air-actuated cylinders and the tractor and trailer brushes are automatically releasably latched in the retracted position by a latching arrangement. During rearward movement of the gantry through a wash cycle, the tractor brushes sequentially scrub the front and side of the tractor below the elevation of the sideview mirrors and the lower portion of the trailer and the trailer brushes sequentially scrub the sides and rear of the trailer. During forward movement of the gantry through a rinse cycle, the trailer and tractor brushes sequentially scrub the trailer and the tractor in the opposite direction. The latching arrangements are automatically operated at an appropriate time during the wash and rinse cycles to retain the tractor brushes in a retracted position during movement between the tractor and trailer.

12 Claims, 11 Drawing Figures

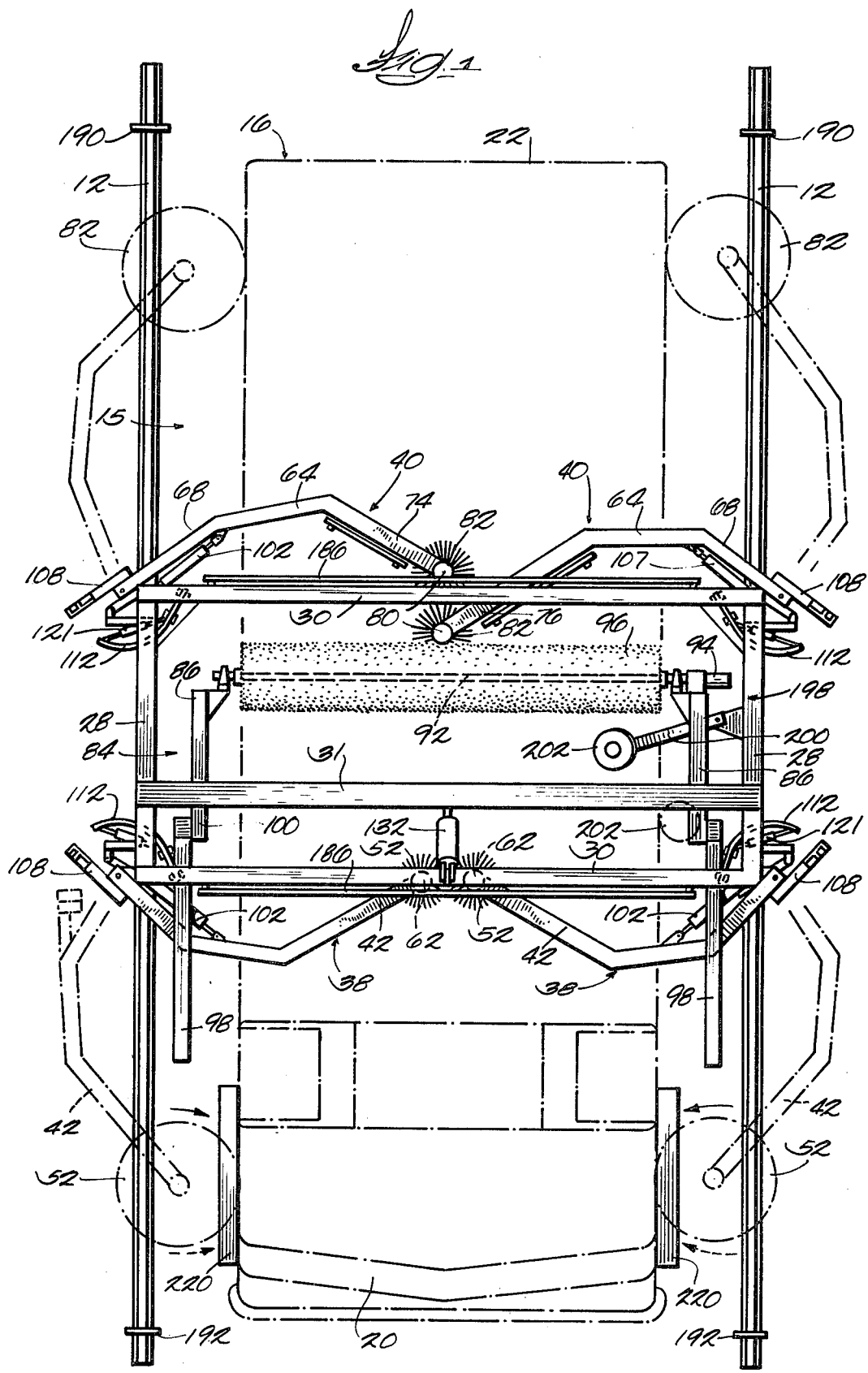

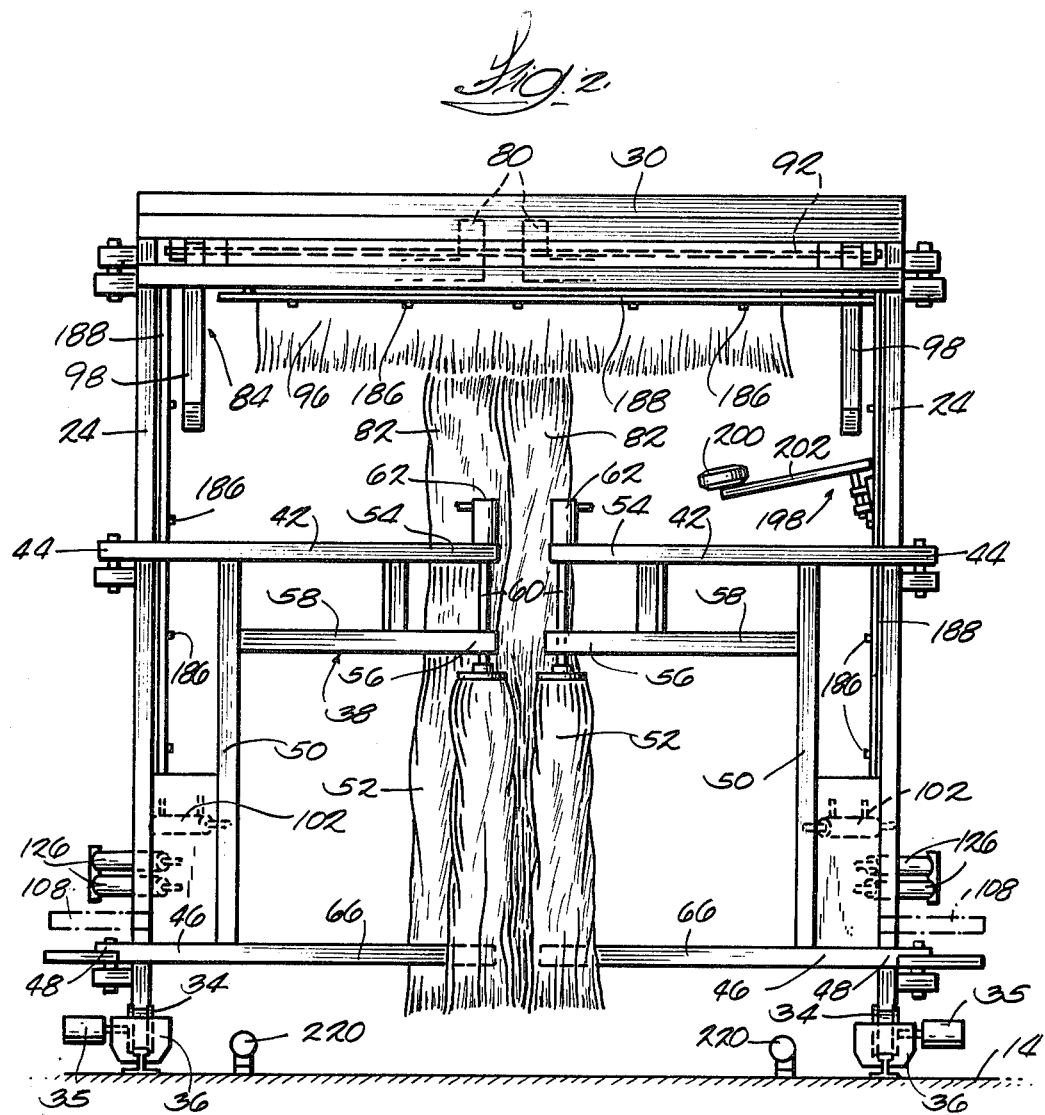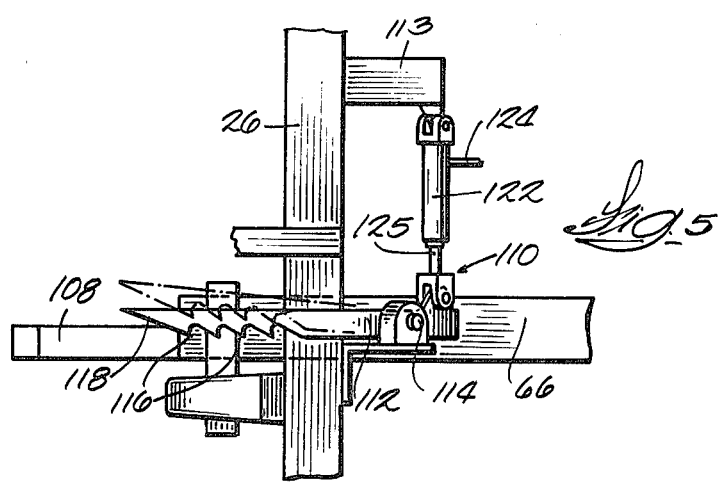

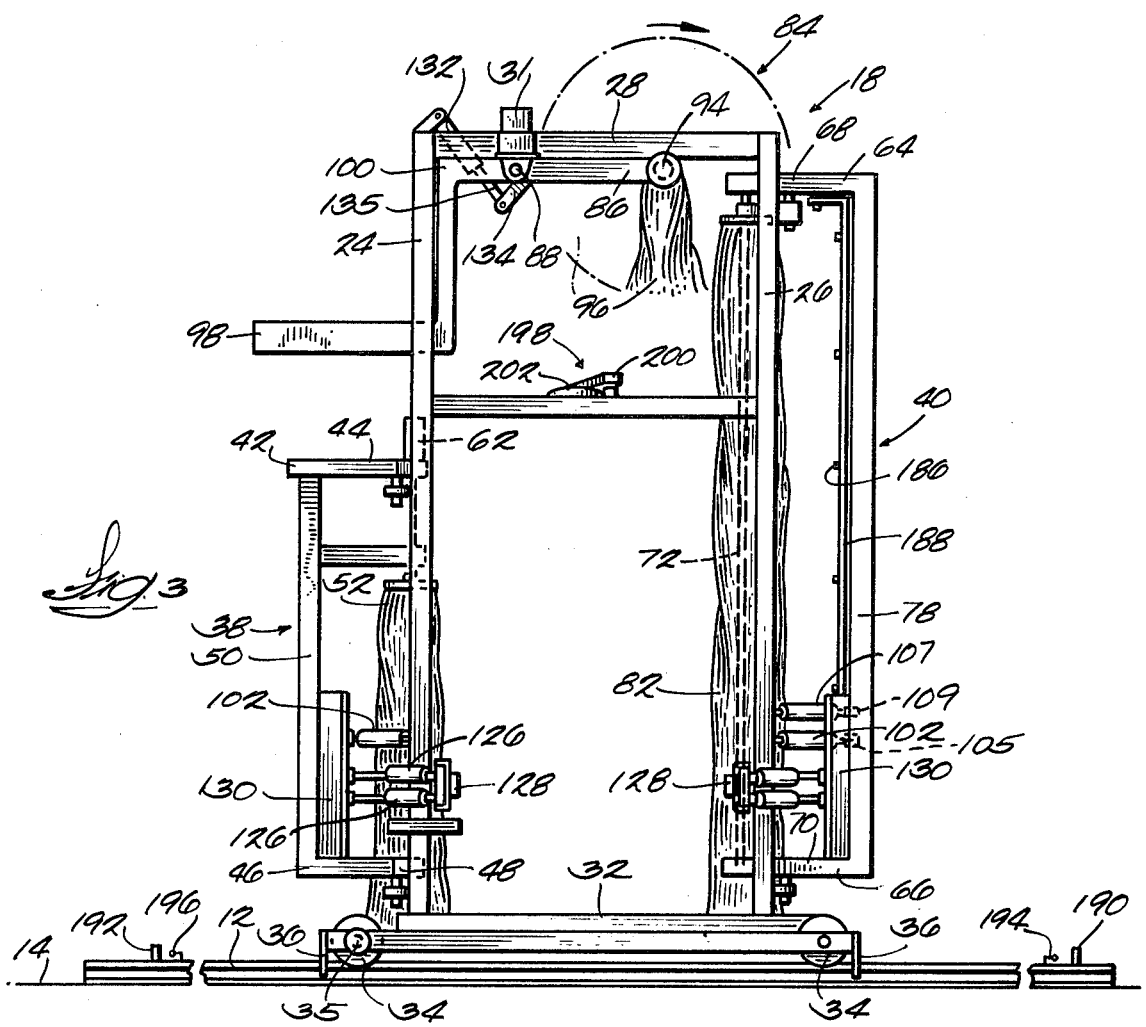
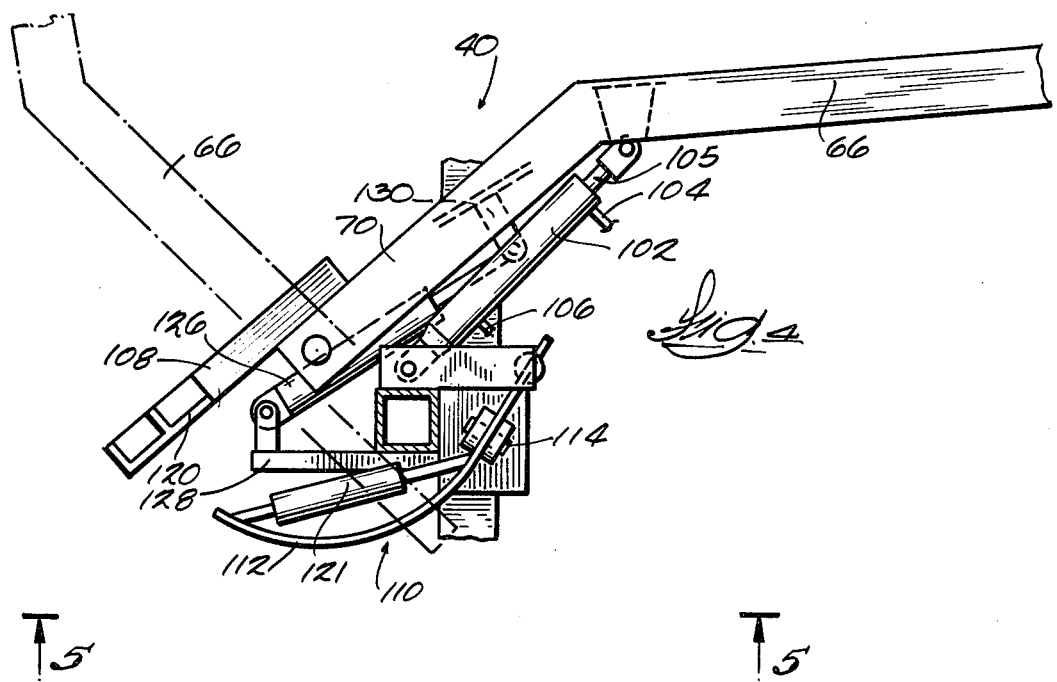

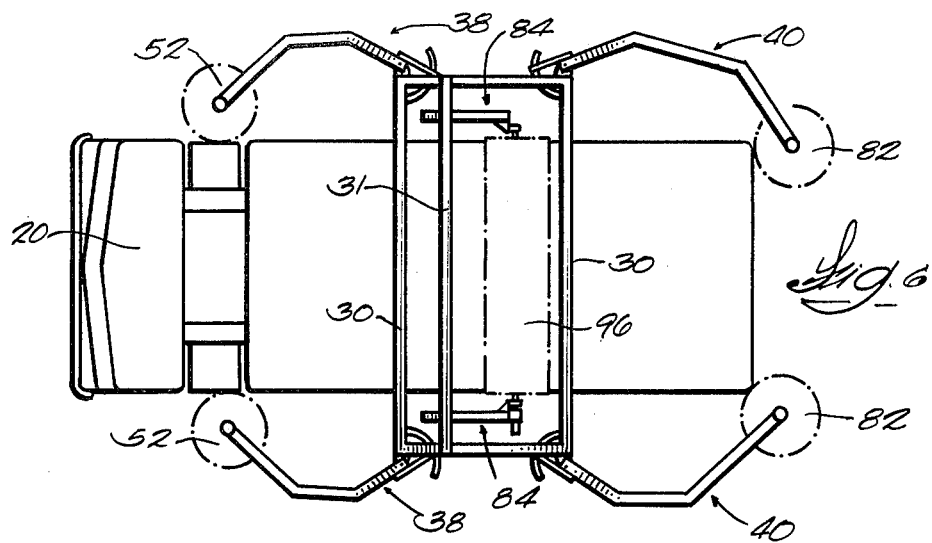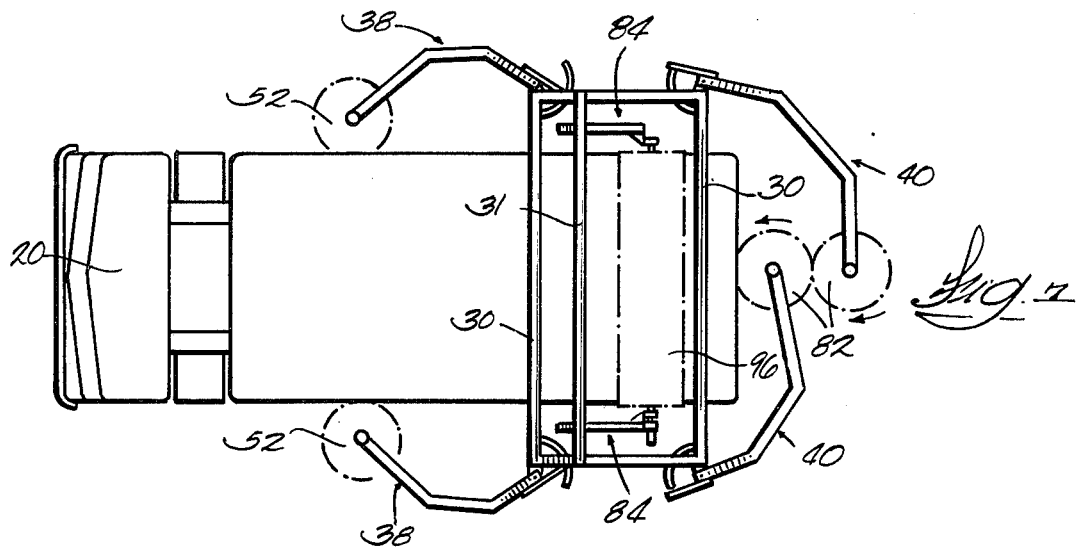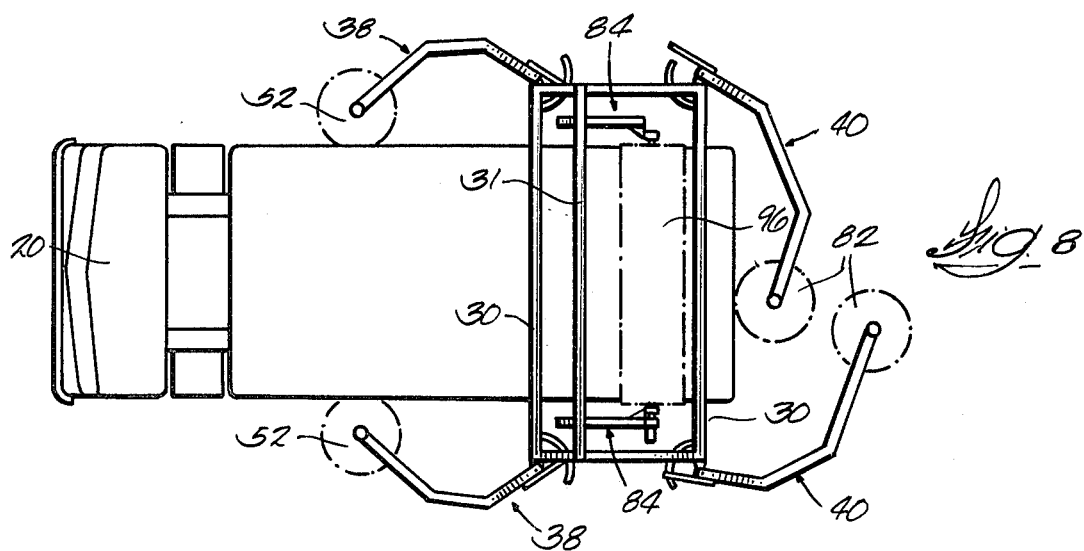

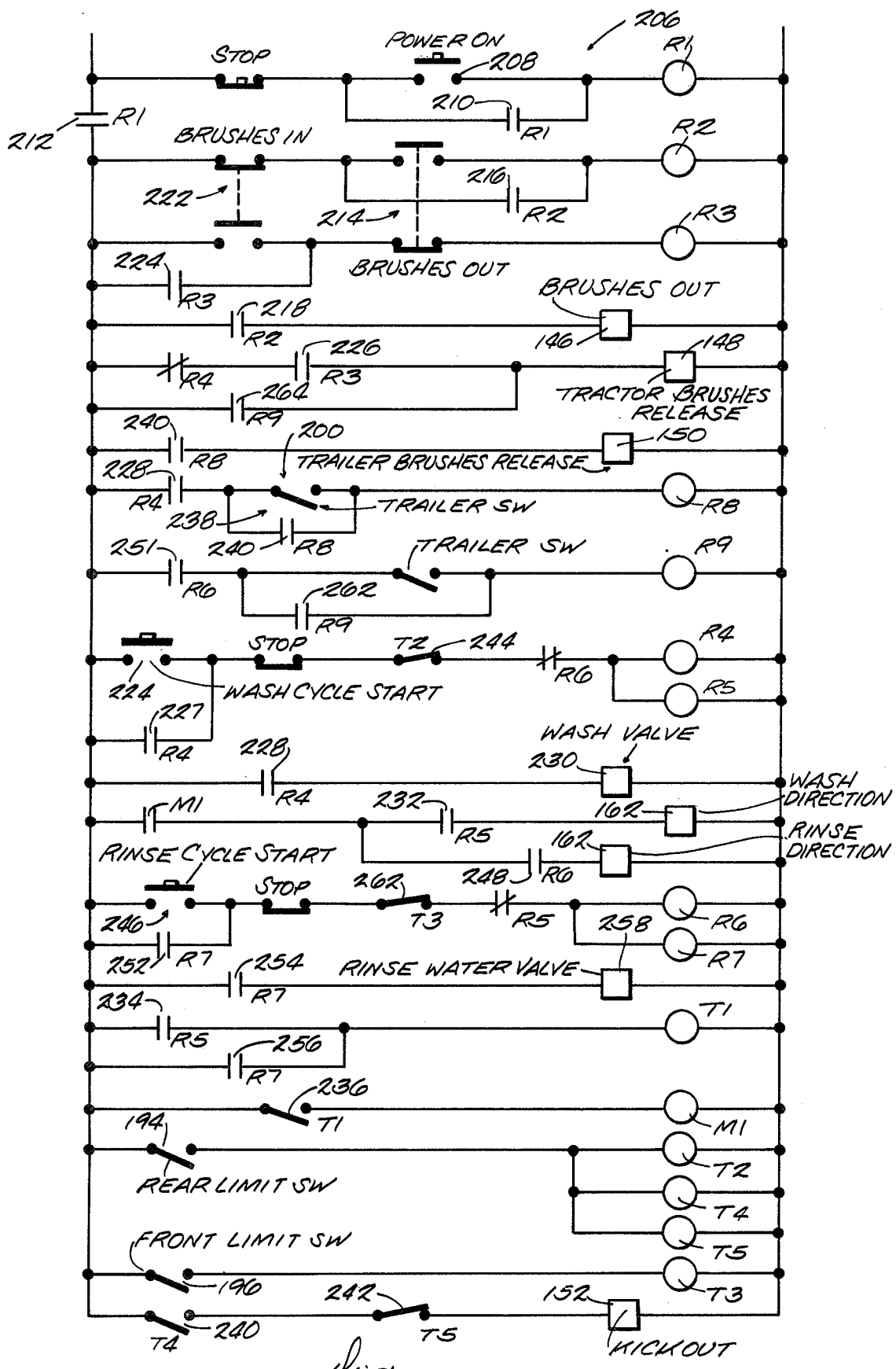

GANTRY WASHING DEVICE FOR TRACTOR-TRAILER TRUCKS

BACKGROUND OF THE INVENTION

This invention relates to vehicle washing systems and, more particularly, to roll-over gantry type washing systems for tractor-trailer truck units.

Roll-over gantry type devices have been used for washing smaller vehicles, such as automobiles and small trucks. Such systems are advantageous because they usually require considerably less space than systems in which the vehicle is driven through or pulled through a wash bay with a conveyor of some sort. Even though scaled up in size, prior roll-over gantry systems are not readily adaptable for use on large tractor-trailer trucks units because of certain special requirements. For instance, the vertical brushes on prior units tend to penetrate into the space between the tractor and the trailer and become "hung-up". The rear of the trailer typically requires extra scrubbing because of the build-up of road film, dirt, etc. and includes various protuberances such as door handles, hinges, vertical bars and the like which hinder scrubbing. Side view mirrors on the tractor and radio antenna can be damaged by the vertical brushes, so the upper and rear portions of the tractor and the front end of the trailer usually must be washed by hand. Accordingly, a roll-over gantry system for large tractor-trailer units, for the most part, should be automatic so that the operator is free to hand wash portions of the tractor and trailer while the wash cycle is being completed.

Applicant is unaware of any prior roll-over gantry systems capable of meeting these and other special reqirements for large tractor-trailer truck units.

SUMMARY OF THE INVENTION

A principal object of the invention is to provide a roll-over gantry type washing device for washing large tractor-trailer truck units.

Another principal object of the invention is to provide such a washing device which is arranged to prevent the vertical brushes from penetrating into the space between the tractor and trailer during the wash and rinse cycles.

A further principal object of the invention is to provide such a washing device which produces added scrubbing of the rear of the trailer, particularly the central portion.

A still further object of the invention is to provide a roll-over gantry type washing device for washing large tractor-trailer truck units which operates primarily automatically during the wash and rinse cycles so that the operator is free to hand wash areas not reached by the brushes.

Other objects, aspects, and advantages of the invention will become apparent to those skilled in the art upon reviewing the following detailed description, the drawings and the appended claims.

The washing device provided by the invention includes a pair of track means or rails defining a wash bay into which a tractor-trailer truck unit can be moved, a gantry adapted to move over the tractor-trailer truck unit and supported on wheels which ride on the rails, a pair of rotary vertical tractor brushes pivotally mounted on the front portion of the gantry and on the opposite sides of the wash bay for pivotal movement about a generally vertical axis between a neutral position disposed substantially centrally in the wash bay and a retracted position disposed laterally outwardly from the tractor-trailer truck unit and a pair of rotary vertical trailer brushes mounted on a rear portion of the gantry and on opposite sides of the wash bay for pivotal movement between a generally vertical axis and between the neutral and retracted positions. The tractor brushes scrub the front and sides of the tractor below the elevation of the side view mirrors and the trailer brushes scrub the entire height of the sides and rear of the trailer as the gantry is driven rearwardly through a wash cycle from a starting position where the tractor brushes are located adjacent the front of the tractor and a stopping position where the trailer brushes are located adjacent the rear of the trailer. The gantry is subsequently driven forwardly through a rinse cycle from the stopping position to the starting position. The tractor and trailer brushes are biased toward the neutral position and are selectively pivoted to the retracted position by fluid-actuated cylinders, such as compressed air cylinders. When the tractor and trailer brushes are moved to the retracted position, they are automatically releasably latched in that position by a latching arrangement which can be selectively released to permit the tractor and trailer brushes to return toward the neutral position.

The tractor and trailer brushes are counter rotated in one direction during the wash cycle and in the opposite direction during the rinse cycle. The latching arrangements for the tractor and trailer brushes are released at appropriate times during the wash and rinse cycle to insure that the tractor brushes are retained in the retracted position during movement between the tractor and trailer and do not penetrate to the space between the tractor and trailer.

The washing device can also include a rotary horizontal top brush mounted on an upper portion of the gantry above the tractor-trailer unit for pivotal movement about a generally horizontal axis between a neutral position for scrubbing the top of the trailer and the retracted position along with the tractor and trailer brushes and is rotated in the clockwise direction, as viewed from the driver side of the tractor-trailer truck unit, during both the wash and rinse cycles.

In one embodiment, each trailer brush is carried on the outer end portion of a pivot arm pivotally mounted on the gantry. The pivot arm carrying one trailer brush is longer than that for the other trailer brush so that the trailer brushes overlap when in the neutral position. The longer-armed trailer brush is selectively pivoted to a kickout position where the other trailer brush can move into a scrubbing position at the central portion of the rear of the trailer, thereby providing additional scrubbing of this area.

In one embodiment, a water system including an electrically operated water control valve is carried by the gantry and an electrical control circuit for energizing motors driving the gantry wheels, energizing motors rotating the brushes, and operating the water control valve includes a switch means operable, in response to the gantry reaching the stopping position during the wash cycle and the starting position during the rinse cycle, to shut off the motors and close the water control valve after a pedetermined shutdown period. The electrical circuit preferably includes an additional time delay for sequentally actuating and deactuating the kickout cylinder so that the longer armed trailer brush can return toward the neutral position prior to expiration of the shutdown time period.

BRIEF DESCRIPTION OF THE DRAWINGS

FIG. 1 is a top plan view of a motorized truck washing device embodying the invention, shown with an abbreviated version of a tractor-trailer truck unit and with the tractor and trailer brush assemblies in a neutral or "brushes in" position (solid lines) and in an operating position (dashed lines).

FIG. 2 is a front elevation view of the truck washing device with the brush assemblies in the neutral position.

FIG. 3 is a side elevation view of the truck washing device with the brush assemblies in the neutral position.

FIG. 4 is an enlarged, fragmentary, top view of the actuator and latching arrangements for the trailer brush assembly on the passenger side of the wash bay.

FIG. 5 is a fragmentary elevation view taken generally along line 5—5 in FIG. 4.

FIGS. 6–8 are reduced, top plan views of the truck washing device schematically illustrating the position of the trailer brush assemblies while scrubbing the rear of the trailer at the end of the wash cycle.

FIG. 11 is a schematic illustration of the electrical control circuit.

DESCRIPTION OF THE PREFERRED EMBODIMENTS

Figure 9:
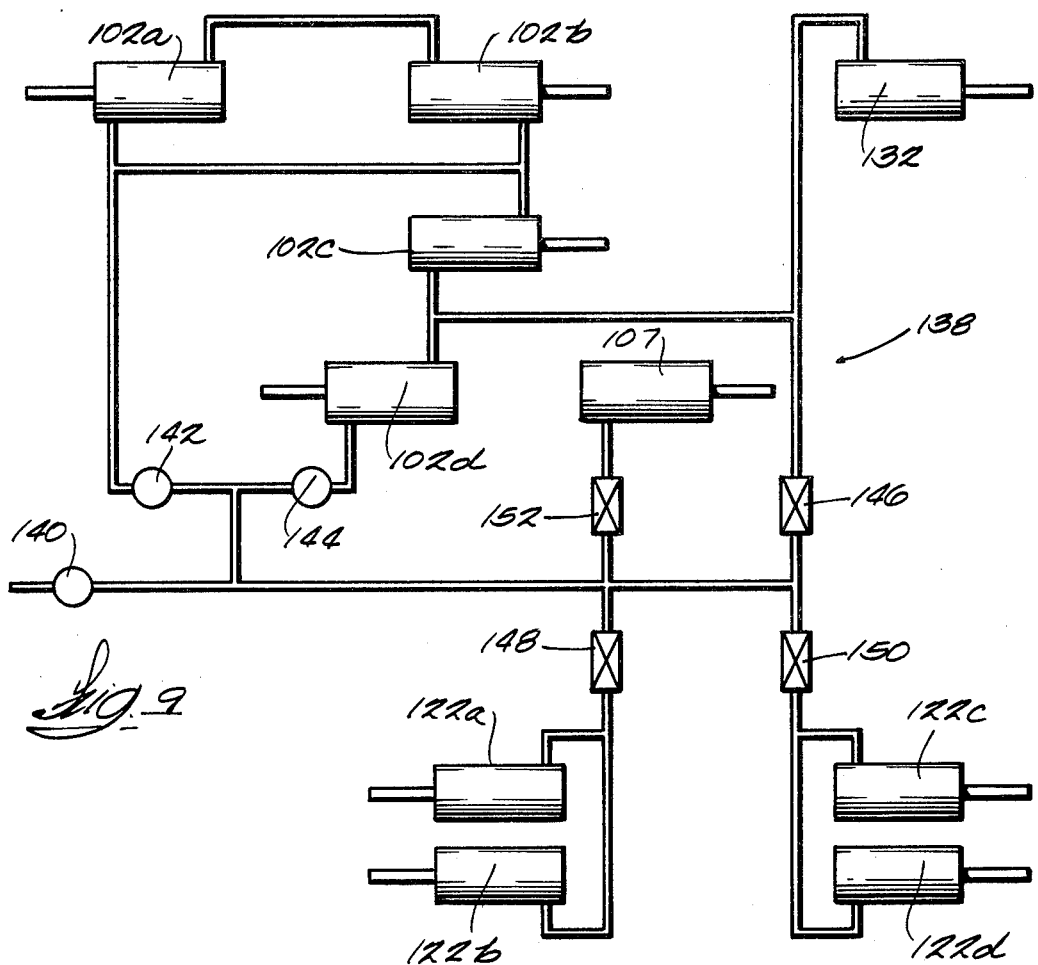
FIG. 9 is a schematic illustration of the pneumatic control system for the compressed air cylinders which pivot the brushes assemblies and release the latching units.

Referring to FIGS. 1–3, the motorized truck washing device 10 includes a pair of laterally-spaced, elongated track means or rails 12 mounted on a concrete deck 14 or the like and defining a wash bay 15 into which a tractor-trailer truck unit 16 can be driven for washing. A gantry 18 rolls along the rails 12 from a starting point at the front of the tractor-trailer unit 16 to a stopping point near the back of the unit to wash the front and sides of the tractor 20 and the top, sides and rear of the trailer 22. The gantry 18 thereafter returns to the starting point to rinse the trailer 22 and the tractor 20.

The gantry 18 includes a pair of laterally-spaced, front stanchions 24 and a pair of laterally-spaced, rear stanchions 26 fixedly connected together at the upper end by a pair of longitudinal members 28, a pair of cross members 30, and a cross brace 31. The lower end of each front stanchion 24 and rear stanchion 26 is fixedly connected together by a longitudinal base or support member 32 carrying a pair of rotatably mounted wheels 34 which support the gantry 18 for travel along the rails 12. At least one wheel 34 of each pair is driven by a conventional hydraulic motor 35 to move the gantry back and forth along the rails 12 as described in more detail below. Mounted on the front and rear ends of each support member 32 is a pair of rail guides 36 which serve to minimize lateral rocking motion of the gantry 18 and to keep the wheels 34 "on track".

A short or tractor brush assembly 38 is pivotally mounted on each front stanchion 24 for pivotal movement about a generally vertical axis and a long or trailer brush assembly 40 is mounted on the rear stanchion 26 for pivotal movement about a generally vertical axis. Each tractor brush assembly 38 includes an upper pivot arm 42 having an inner end 44 pivotally mounted on a front stanchion 24 and a lower pivot arm 46 having an inner end 48 also pivotally mounted on a front stanchion 26. The upper and lower pivot arms 42 and 46 are fixedly connected together by a vertical member 50.

A rotary vertical brush 52 is suspended from the outer end 54 of the upper pivot arm 42 and the outer end 56 of a support arm 58 spaced below and extending parallel to the upper pivot arm 42 with the inner end affixed to the vertical member 50. Each tractor brush 52 is mounted on a vertical drive shaft 60 which is rotatably driven by a conventional hydraulic motor 62. The tractor brushes 52 are of conventional design and have flexible bristles which are flailed outwardly by centrifugal force to impinge on and wipe the surfaces the tractor 20 and the trailer 22 with a scrubbing action when the hydraulic motor 62 is operating. The tractor brushes 52 are positioned so that the tops are located just below the outwardly extending sideview mirrors (not shown) on the tractor. This permits the tractor brushes 52 to scrub the front and sides of the tractor 20 without damaging radio antennas and/or sideview mirrors.

Each trailer brush assembly 40 includes upper and lower pivot arms 64 and 66 having respective inner ends 68 and 70 which are pivotally mounted on a rear stanchion 26, a vertical drive shaft 72 extending between and rotatably mounted on the outer ends 74 of the pivot arms 64 and 66, and a vertical support member 78 fixedly interconnecting the upper and lower pivot arms 64 and 66 at a point intermediate the inner and outer ends thereof. The drive shaft 72 is rotatably driven by a conventional hydraulic motor 80 and carries a rotary vertical brush 82 which can be of the same type as of the tractor brushes 52. The trailer brushes 82 are positioned and dimensioned to scrub the entire height of the trailer sides and rear.

The tractor-trailer unit 16 usually is substantially longer than the abbreviated version illustrated in FIG. 1. That is, the tractor brushes 52 are scrubbing the lower part of the trailer 12 when the trailer brushes 82 are located near the rear of the trailer 22 rather than still scrubbing the tractor 20 as illustrated.

The nose and top of the trailer 22 is scrubbed by a top brush assembly 84 mounted on the longitudinal members 28 for pivotal movement about a generally horizontal axis. The top brush assembly 84 has a carriage including a pair of laterally-spaced arms 86 pivotally mounted on the longitudinal members at 88. This pivot mount is hidden under the cross brace 31 in FIG. 1. Extending between and rotatably mounted on the rear ends 90 of the arms 86 is a horizontal drive shaft 92 driven by a conventional hydraulic motor 94 and carrying a rotary horizontal brush 96 which can be the same type as the tractor brushes 52 and the trailer brushes 82. The top brushes 96 is positioned and dimensioned to scrub the entire width of the trailer top. The top brush assembly 96 is counterbalanced by a pair of L-shaped arms 98 which extend forwardly from the ends 100 of the arms 86.

An actuation system is provided for moving the tractor brush assemblies 38, the trailer brush assemblies 40 and the top brush assembly 84 between a neutral position and a retracted or "brushes out" position where the tractor-trailer unit 16 can be driven into and out of the wash bay 15. The tractor and trailer brush assemblies 38 and 40 are disposed substantially centrally in the wash bay 15 when in the neutral position. In the specific embodiment illustrated, the actuation system includes a compressed air cylinder for biasing each of the tractor brush assemblies 38 and each of the trailer brush assemblies 40 inwardly toward a neutral positon and also for moving those assemblies to a retracted position, a latching arrangement for releasably retaining those assemblies in a retracted position and a compressed air cylinder for releasing the latching arrangement.

The latching arrangement for each of the tractor brushes assemblies 38 and each of the trailer brush assemblies 40 is substantially the same. Therefore, only the arrangement for the trailer brush assembly 40 on the passenger side (the top left hand one as viewed in FIG. 1) is illustrated in detail in FIGS. 4 and 5.

Referring to FIGS. 4 and 5, a compressed air cylinder 102 is pivotally connected at one end to a a rear stanchion 26 and pivotally connected at the other end to a lower pivot arm 66. Compressed air is applied to the rod end of the cylinder piston (not shown) through a hose 104 and is selectively applied to the base end of the cylinder piston through a hose 106. As explained in more detail below, air pressure is maintained on the piston rod end of the cylinder to bias the trailer brush assembly 40 toward the neutral position. When it is desired to move the trailer brush assembly 40 to the retracted position, compressed air at a substantially higher pressure is selectively applied to the base end of the cylinder piston through the hose 106 to extend the piston rod 105.

The rear of the trailer 22, particularly the central portion, usually is the most difficult to wash because of the buildup of road film and protuberances such as door handles, hinges, etc. The trailer brush assemblies 40 are arranged to provide extra scrubbing of this area of the trailer 22. The upper and lower pivot arm 64 and 66 of the trailer brush assemblies 40 on the driver side (the right side as viewed in FIG. 1) are longer than their counterparts on the passenger side. With this arrangement, the trailer brush 82 on the driver side is located in front of the trailer brush 82 on the passenger side when the trailer brush assemblies 40 reach the middle of the rear of the trailer as best illustrated in FIG. 7. The pressure maintained on the piston rod end of the brush cylinder 102 on the driver side is higher than that for the cylinder 102 on the passenger side to insure that the trailer brush 82 on the driver side penetrates behind the other trailer brush as discussed in more detail below.

The trailer brush 82 on the driver side is subsequently moved out from in front of the trailer brush 82 on the passenger side by a compressed air kickout cylinder 107 pivotally connected at one end to the rear stanchion 26 on the driver side and pivotally connected at the other end to the lower pivot arm 66 of the trailer brush assembly 40 on the driver side. Compressed air is selectively applied to the base side of the cylinder piston (not shown) to extend the piston rod 109 and momentarily move the trailer brush assembly 40 on the driver side away from the rear of the trailer 22 as illustrated in FIG. 8.

Mounted on and extending axially outwardly from the inner end 70 of the lower pivot arms 66 is a latch arm 108 which cooperates with a latching unit 110 to releasably retain the trailer brush assembly 40 in a retracted position until the latching unit 110 is released. The latching unit 110 includes an arcuate ratchet 112 which is located in the travel path of the latch arm 108 and is pivotally supported at 114 from a rear stanchion 26.

The ratchet 112 includes a plurality of ratchet teeth 116 and a camming surface 118 on the outer end. The camming surface 118 rides over an edge 120 on the latch arm 108 during initial movement of the trailer brush assembly 40 toward the retracted position. The lower edge of the ratchet 112 is gravity biased by a weight 121 downwardly toward a latching position in engagement with the latching arm edge 120 (illustrated by solid lines in FIG. 5) to retain the trailer brush assembly 40 in a retracted position (illustrated by the dashed lines in FIG. 4).

A compressed air latch release cylinder 122 is pivotally connected at one end to the inner end of the ratchet 112 and pivotally connected at the upper end to a bracket 113 on a rear stanchion 26. When compressed air is selectively supplied through a hose 124 to the base end of the cylinder piston (not shown), the piston rod 125 is extended to pivot the outer end of the ratchet 112 upwardly and disengage the ratchet teeth 106 from the latch arm 108 (as illustrated by dashed lines in FIG. 5). When this occurs, the trailer brush assembly 40 is returned toward an operating position by the brush cylinder 102, because air pressure is maintained in the piston rod end of the piston through the hose 104.

A pair of compressed air shock absorbers 126 pivotally connected at one end to a bracket 128 on a rear stanchion 26 and pivotally connected at the other end to a bracket 130 on a lower pivot arm 66 (as best shown in FIG. 3) act as springs to minimize bouncing of the brushes during the washing and rinsing cycles.

As mentioned above, substantially the same arrangement is used with each of the tractor brush assemblies 38. The only significant difference is that the cylinders 102 and shock absorbers 126 are connected between a front stanchion 24 and a lower pivot arm 46, the latch arms 108 extend from a lower pivot arm 42, the ratchets 112 are pivotally supported from a front stanchion 24 and the release cylinders 122 are pivotally mounted on a bracket 113 on a front stanchion 124.

The top brush assembly 84 is biased toward the neutral or "brushes in" position by gravity as mentioned above. It is moved to a retracted or "brushes out" position by a compressed air cylinder 132 pivotally connected at one end to a cross number 30 and pivotally connected at the other end to a lever arm 134 connected to the top brush assembly carriage. Compressed air is selectively applied to the base side of the cylinder piston (not shown) through a hose (not shown) to extend the piston rod 135 and pivot the top brush assembly upwardly about its pivot point 88 (in a counterclockwise direction as viewed in FIG. 3).

FIG. 9 is a diagrammatic illustration of the pneumatic control system 138 for the brush cylinders 102, the release cylinders 122 and the kickout cylinder 107. A primary regulator 140 connected to a source of compressed air (not shown) regulates the incoming air to a pressure in the order of 150 psig. One secondary regulator 142 supplies air at a pressure in a order of 40 psig to the piston rod ends of the driver side tractor brush cylinder 102a, the passenger side tractor brush cylinder 102b and the passenger side trailer brush cylinder 102c. Another secondary regulator 144 supplies air at a pressure in the order of 60–65 psig to the piston rod end of the driver side trailer brush cylinder 102d.

Air from the primary regulator 140 is supplied to the piston base end of all tractor and trailer brush cylinders 102a, 102b, 102c, and 102d and the piston base end of the top brush cylinder 132 through a solenoid-operated, brushes out valve 146. When the brushes out valve 146 is energized, both the tractor brush assemblies 38 and both the trailer brush assemblies 40 are moved to the retracted position, because of the higher pressure (150 psig) being applied to the piston base end of brush cylinders 102a, 102b, 102c, and 102d. The top brush assembly 84 is also moved to the retracted position. When a brushes out valve 146 is deenergized, the air pressure in the piston base ends of the tractor, trailer and brush cylinders is relieved.

Air from the primary regulator 140 is applied to the piston base end of the kickout cylinder 107 through a solenoid-operated kickout valve 152. When the kickout valve 152 is energized, the trailer brush assembly 40 on the driver side is moved to a kickout position. When the valve 152 is deenergized, the air pressure in the piston base end of the kickout cylinder 107 is relieved.

The hydraulic motors 62 and 80 driving the tractor and trailer brushes 52 and 82 are connected to one hydraulic pump (not shown) through a conventional solenoid-operated flow control valve (not shown) which controls the flow of hydraulic fluid so that tractor end trailer brushes counterrotate in one direction during the wash cycle and counterrotate in opposite direction during the rinse cycle.

Figure 10:
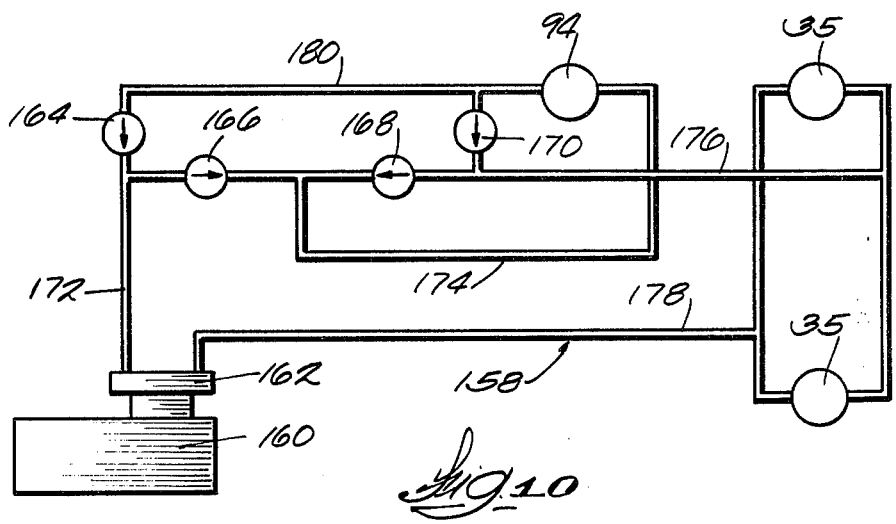
FIG. 10 is a schematic illustration of the hydraulic control system for the motors driving the gantry wheels and the top brush.

The hydraulic motors 35 and 94 driving the drive wheels 34 and the top brush 96 are connected to another hydraulic pump through a hydraulic control system arranged to drive the drive wheels 34 in one direction during the wash cycle and in the opposite direction during the rinse cycle, but drive the top brush 96 in the same direction during both cycles. FIG. 10 is a diagrammatic illustration of this control system. The control system 158 includes the hydraulic pump 160, a conventional solenoid-operated flow direction control valve 162 and four one-way check valves 164, 166, 168 and 170.

When the flow direction control valve 162 is energized for the wash cycle, hydraulic fluid flows through a line 172, check valve 166, a line 174, top brush drive motor 94, check valve 170, a line 176, drive wheel drive motors 35, and returns through a line 178 and directional control valve 162. The hydraulic fluid does not flow through check valve 168 in the direction of the arrow because the pressure in line 174 is higher than that in line 176.

When the direction control valve 162 is energized for the rinse cycle, hydraulic fluid flows in the opposite direction through line 178, drive wheel motors 35 and line 176. It then flows through check valve 168, line 174, the same side of the top brush drive motor 94 and returns through a line 180 and check valve 164. The hydraulic fluid returning from the top brush drive motors 94 does not flow through check valves 170 and 166 in the direction of the arrows because the pressure in lines 176 and 174 is higher than that in line 180.

During the wash cycle, water and detergent supplied through a water system carried by the gantry 18 is sprayed over the surfaces of the tractor 20 and trailer 22 via a plurality of spray nozzles 186 on pipes 188 located to provide full spray coverage of the front, top, sides and rear of the tractor 20 and trailer 22. For example, the pipes 188 can be mounted on and extend along one or both of the front stanchions 24, one or both of the rear stanchions 26, one or both of the top longitudinal members 28, one or both of the top cross members 30, one or both of the vertical members 78, one or both of the upper and lower pivot arms 64 and 66 of the trailer brushes assemblies 40, etc. Spray nozzles 186 are also located to direct a flow of water and detergent onto each of the brushes. During the rinse cycle, only water is sprayed over the surfaces of the tractor and trailer and onto the brushes through the spray nozzles 186. Only a portion of the spray nozzles 186 and pipe 188 is illustrated for the sake of clarity and simplifying the drawings.

Operation of the washing device through the wash and rinse cycles is automatic for the most part, leaving the operator free to hand wash areas not reached by the brushes while the gantry 18 completes the wash cycle and starts its return trip during the rinse cycle. Rearward travel of the gantry 18 during the wash cycle and forward travel during the rinse cycle is physically limited by rear and front wheel stops 190 and 192 on the rails 12. The shut down of brushes, hydraulic motors and water/detergent flow at the end of the wash and rinse cycles is triggered by the wheels 34 engaging rear and front electrical limit switches 194 and 196 on one of the rails 12. Release of the tractor and trailer brush assemblies 38 and 40 to provide the desired scrubbing while preventing the tractor brushes 52 from penetrating the space between the tractor 20 and the trailer 22 and becoming "hung up" is controlled by a two position trailer switch assembly 198 including a wheel 200 rotatably mounted on an acutating arm 202 which is pivotally supported on a longitudinal support brace 204 connected between a front stanchion 24 and a rear stanchion 26. When the wheel switch assembly 198 is in its normal position illustrated in FIG. 2, the inner end of the arm 202 closes a set of electrical contacts as explained in more detail below. As a gantry 18 moves rearwardly during the washing cycle, the wheel 200 engages the front of the trailer 22, causing the arm 202 to pivot so that the wheel 200 can ride along the side of the trailer. When this occurs, the inner end of the arm 202 closes another set of electrical contracts as explained in more detail below.

FIG. 11 schematically illustrates an electrical control circuit 206 for controlling the operation of the washing device 10. This circuit will be described along with a description of the operation of the washing device.

The operator first presses a power on button 208 which energizes relay R1 to close its normally open contacts 210 and 212 and supply electrical power to the electrical circuit. The operator then presses a momentary brushes out button 214 which energizes relay R2 to close its normally open contacts 216 and 218 which energizes the brushes out valve 146 in the pneumatic control system 138 and all the brush assemblies are moved to a retracted or brushes out position (the position illustrated by dashed lines in FIG. 1). The tractor-trailer unit 16 can then be driven into wash bay 15 and properly positioned relative to the gantry 18 as indicated by a pair of laterally-spaced fron wheel guides 220 on the deck 14.

The operator then presses a momentary brushes in button 222 to open the circuit to relay R2 which deengergizes and its normally contacts 218 open to deenergize the brushes out valve 146 in the pnuematic control system 138. At the same time, relay R3 is energized to close its normally open contacts 224 and 226 and the tractor brushes release valve 150 in the pneumatic control system 138 is energized to release the tractor brush assemblies 38 to the neutral position (the position illustrated in FIG. 2 and by the solid lines in FIG. 1). The trailer brush assemblies 40 are not released at this time and are retained in the retracted position by the respective latching arrangements. The top brush assembly 84 is released by virtue of the brushes out valve 146 being deenergized and is returned by gravity to the neutral position.

The operator then presses a wash cycle start button 224 which energizes relay R4 to close its normally open contacts 227 and 228 which energizes a solenoid-operated wash valve 230 open. The tractor 20 and all the brushes are flooded with water and detergent through the spray nozzles 186. At the same time, relay R5 is energized to close its normally open contacts 232 and 234 which energizes the flow direction control valve 162 in the hydraulic control system 158 to the wash direction and starts timer T1. When timer T1 times out, its normally open contacts 236 close and starts the hydraulic pumps which supply pressurized hydraulic fluid to the drive motors 35 for the wheels 34, the drive motors 62 for the tractor burshes 52, the drive motors 80 for the trailer brushes 82 and the drive motor 94 for the top brush 96.

As viewed in FIG. 1, the tractor and trailer brushes 52 and 82 on the passenger (left) side are rotated in the clockwise direction and those on the driver (right) side are rotated in the counterclockwise direction as illustrated by the solid arrows. The top brush 96 is rotated in the clockwise direction as viewed in FIG. 3.

As the gantry 18 starts moving rearwardly, the tractor brushes 52 contact the scrub the front of the tractor 20 as they are moved outwardly from the center toward the outer corners. When they reach the outer corners, the operator momentarily presses the brushes out button 214. This moves the tractor brush assemblies 38 to the retracted position where they are latched in place by the respective latching arrangement for their trip down past the tractor 20 and along the trailer 22 without penetrating into the space between the tractor and trailer. The trailer brush assemblies 40 are also moved out and locked in a retracted position at this time, but are automatically released at the appropriate time to provide the desired scrubbing of the trailer.

As the gantry 18 starts to move past the tractor 20, the wheel 200 on the wheel switch assembly 198 engages the front of the trailer 22 and the arm 202 is rotated to close contacts 238. This energizes relay R8 to close its normally open contacts 240 and 242 which energizes the trailer brushes relase valve 150 and the pneumatic control system 138. The trailer brush release cylinders 102c and 102d release the respective latches 112 and the trailer brushes 82 are biased into scrubbing engagement with the sides of the trailer 22 by the pressure applied on the piston rod end of the trailer brush cylinders 102c and 102d. As the gantry 18 continues rearwardly over the trailer, the trailer brushes 82 scrub the sides of the trailer from the tires up to the top. The shock abosrbers 126 assist in preventing the trailer brushes 82 from bouncing away from the sides of the trailer. The top brushes 96 scrubs the nose and top of the trailer. The tractor brushes 52 scrub the lower portion of the trailer and give this dirtier portion a second washing.

As the gantry 18 moves past the position shown in FIG. 6 and reaches the stopping position shown in FIG. 7, the trailer brushes 82 work their way around the rear corners of the trailer and move toward the center to scrub the rear of the trailer. The trailer brush 82 on the driver side penetrates behind the trailer brush 82 on the passenger side by virtue of the pivot arms 64 and 66 being longer and a higher pressure being applied on the piston rod end of the trailer brush cylinder 102d as described above. The rear rail guides 36 engage the rear wheel stops 190 to physically stop the gantry 18 and a rear wheel 34 engages and closes the rear limit switch 194 to trigger the rear washing and wash cycle shutdown sequence.

Timers T2, T4 and T5 are started upon closure of the rear limit switch 194. During this time, the trailer brush 82 on the driver side continue to rotate in the counter-cockwise direction as viewed in FIG. 7 and scrubs the central portion of the rear of the trailer. When timer T4 times out, its normally open contacts 240 close and the kickout valve 152 in the pneumatic control system 138 is energized. The kickout cylinder 107 moves the trailer brush assembly 40 on the driver side to a kickout position as shown in FIG. 8. This permits the trailer brush 82 on the passenger side to move in and scrub the central area of the rear of the trailer in the opposite direction which tends to loosen and remove dirt, road film, etc., not removed during the previous scrubbing.

When the time T5 times out, its normally closed contacts 242 open to deenergize the kickout valve 152. The trailer brush assembly 40 on the driver side returns toward its starting position and bears against the other trailer brush 82 to produce a more vigourous scrubbing action because of the higher pressure applied on the piston rod end of the trailer brush cylinder 102d. When the timer T2 times out, its normally closed contacts 244 open to deenergize relays R4 and R5. The normally open contacts 226, 228, 232 and 234 of relays R4 and R5 open to stop the hydraulic pumps and close the wash valve 230, automatically terminating the wash cycle.

From the above description, it can be seen that the operation of the washing device is completely automatic during the wash cycle, after the operator has pressed the brushes out button 214 at the time the tractor brushes 52 reach the front corners of the tractor. Subsequent to that time, the operator is free to hand wash those areas not reached by the brushes and take as much time as required because the device stops automatically.

Upon completion of this hand washing, the operator can immediately start the washing device on its return or rinse cycle. Sufficient rinse water is provided through the pipes 188 and the spray nozzles 186 to eliminate the necessity of hand rinsing the areas which have been hand washed.

To start the rinse cycle, the operator presses a rinse cycle start button 246 which energizes relay R6 to close its normally open contacts 248, 250 and 251 which energizes the flow direction control valve 162 in the hydraulic control system 158 to the rinse direction. The flow direction control valve (not shown) for the tractor and trailer brush drive motors 62 and 80 is energized to a position where the brushes on the passenger side are rotated in a counterclockwise direction and those on the driver side are rotated in the clockwise position during the rinse cycle as illustrated by the dashed arrows in FIG. 1. At the same time, timer T1 is started and relay R7 is energized to close its normally contacts 252, 254 and 256 to open a solenoid-operated rinse valve 258 connected to a supply of fresh water (not shown). The rinse water first flushes the detergent from the pipes 188 and spray nozzles 186 and then floods all the brushes and surfaces of the tractor-trailer unit as the gantry 18 moves forward over the trailer and tractor.

When timer T1 runs out, its normally open contacts 236 close and start the hydraulic pumps applying pressure to the motors for driving the wheels and the brushes like at the start of the wash cycle. Since the flow direction control valve 162 is in the rinse position, the drive wheels 34 are rotated in the opposite direction to move the gantry 18 forwardly while the top brush 96 rotated in the same direction as during the wash cycle as explained above. The counterrotating effect of the top brush 96 during forward movement of the gantry 18 serves to sweep water off the top of the trailer 22.

As the gantry 18 moves forward, the trailer brushes 82 contact and scrub the rear of the trailer as they move outwardly from the center. When the reach the rear corners, the operator momentarily (e.g. 3-5 seconds) presses the brushes out button 214 and then presses the brushes in button 221. This moves the tractor brush assemblies 38 to a locked in retracted position for travel along the trailer without penetrating into the space between the tractor and the trailer and releases the trailer brush assemblies 40 for scrubbing engagement with the sides of the trailer.

As the gantry 18 starts to move over the tractor 20 and reaches a point where the tractor brushes 52 are past the space between the tractor and the trailer, the wheel 200 on the wheel switch assembly 198 is disengaged from the trailer and the arm 202 returns to its normal position to close contacts 260. This energizes relay R9 to close its normally open contracts 262 and 264 which energizes the tractor brushes release valve 148 in the pneumatic control system 138. The tractor brush release cylinders 102a and 102b release the respective latches 112 and the tractor brushes 52 are biased into scrubbing engagement with the sides of the tractor 20.

As the gantry 18 approaches its starting position, the tractor brushes 52 work their way around the front corners of the tractor 20 and move toward the center. The gantry 18 continues forward until the front rail guides 36 engage the front wheel stop 192 and a front wheel engages and closes the front limit switch 196 which starts a timer T3. When timer T3 times out, its normally closed contacts 262 open to deenergize relays R6 and R7. The normally open contacts 248, 250, 251, 252, 254 and 256 of relays R6 and R7 open to stop the hydraulic pumps and close the rinse valve 258 to automatically terminate the rinse cycle.

After the gantry and brushes have stopped, the operator presses the brushes out button 214 which moves all the brushes to a retracted position so the tractor trailer unit can be moved out of the wash bay 15.

I claim:
1. A device for washing tractor-trailer truck units including
   a pair of laterally-spaced, elongated track means defining a wash bay into which a tractor-trailer unit can be moved;
   a gantry adapted to move over the tractor-trailer unit and including laterally-spaced, front and rear upright stanchions supported on wheel means which ride on said track means;
   a pair of rotary vertical tractor brushes pivotally mounted on a front portion of said gantry and on the opposite sides of the wash bay for pivotal movement about a generally vertical axis between a neutral position disposed substantially centrally in the wash bay and a retracted position disposed laterally outwardly from the tractor-trailer unit, said tractor brushes being adapted to scrub the front and sides of the tractor below the elevation of side view mirrors;
   a pair of rotary vertical trailer brushes mounted on a rear portion of said gantry and on the opposite sides of the wash bay for pivotal movement about a generally vertical axis between said neutral position and said retracted position, said trailer brushes being adapted to scrub the entire height of the sides and rear of the trailer;
   means for driving said wheel means to move said gantry rearwardly through a wash cycle from a starting position wherein said tractor brushes are located adjacent the front of the tractor and a stopping position wherein said trailer brushes are located adjacent the rear of the trailer and to subsequently move said gantry forwardly through a rinse cycle from the stopping position to the starting position;
   biasing means for biasing said tractor and trailer brushes toward the neutral position;
   acutation means for selectively pivoting said tractor and trailer brushes to the retracted position;
   latch means for releasably latching said tractor and trailer brushes in the retracted position in response to movement of said tractor and trailer brushes to the retracted position;
   release means for selectively releasing said latch means to permit said tractor and trailer brushes to return toward the neutral position;
   means for operating said release means in response to movement of said gantry past a predetermined location on the tractor-trailer unit; and
   means for counterrotating said tractor brushes and said trailer brushes in one direction during the wash cycle and in the opposite direction during the rinse cycle so that, during rearward movement of said gantry though the wash cycle, said tractor brushes sequentially scrub the front and the sides of the tractor and the lower portion of the trailer and said trailer brushes sequentially scrub the sides and rear of the trailer and so that, during forward movement of the gantry through the rinse cycle, said trailer brushes sequentially scrub the rear and sides of the trailer and said tractor brushes sequentially scrub the lower part of the trailer and the sides and front of the tractor, said latch means retaining said tractor brushes in the retracted position during movement between the tractor and trailer and thereby preventing said tractor brushes from penetrating into the space between the tractor and the trailer.

2. A washing device according to claim 1 including a rotary horizontal top brush mounted on an upper portion of said gantry above the tractor-trailer unit for pivotal movement about a generally horizontal axis between a neutral position for scrubbing the top of the trailer and a retracted position deposed vertically upwardly from the top of the trailer;
   means for selectively moving said top brush to the retracted position; and
   means for rotating said top brush in the clockwise direction, as viewed from the driver side of the tractor-trailer unit, during both the wash and rinse cycles.

3. A washing device according to claim 2 wherein each of said tractor brushes is carried on the outer end portion of a pivot arm pivotally mounted on the front portion of said gantry;

said top brush is carried on a pivot arm pivotally mounted on an upper portion of said gantry; and said actuation means includes a fluid-actuated cylinder pivotally connected between said gantry and each of said pivot arms and having a piston rod for moving the respective brush to the retracted position upon being extended; and brush control valve means for selectively introducing a pressurized actuation fluid into one end of each of said cylinders to extend said piston rod.

4. A washing device according to claim 3 wherein said biasing means for biasing said tractor and trailer brushes toward the neutral position include means for introducing and maintaining the actuating fluid, at a lower pressure, in the other end of each of said cylinders tending to retract said piston rod.

5. The washing device according to claim 1 wherein each of said trailer brushes is carried on the outer end portion of a pivot arm pivotally mounted on a rear portion of said gantry, said pivot arm carrying one of said trailer brushes being longer than that for the other of said trailer brushes so that said trailer brushes overlap, when in the neutral position and being rotated, with said one trailer brush being located in a scrubbing position at the central portion of the rear of the trailer and in front of said other trailer brush; and said actuation means includes means for selectively pivoting said one trailer brush to a kickout position wherein said other trailer brush is permitted to move into a scrubbing position at the central portion of the rear of the trailer.

6. A washing device according to claim 5 including a water system carried by said gantry for spraying water/detergent and rinse water over the tractor-trailer unit during the wash cycle and the rinse cycle, respectively;

an electrically operated water control valve means for selectively controlling the flow of water/detergent and rinse water to said water system; and an electrical control circuit connected to a source of electrical power for energizing said drive means for said drive wheel means, said means for rotating said brushes and said water control valve means, said electrical circuit including a switch means operable, in response to said gantry reaching the stopping position during the wash cycle and the starting position during the rinse cycle, to shut-off said drive means for said drive wheel means and said means for rotating said brushes and to close said water control valve means after a predetermined shutdown time period.

7. A washing device according to claim 6 wherein said electrical circuit is arranged to energize the means for pivoting said one trailer brush to the kickout position after the expiration of a predetermined time period from the time said switch means is operated in response to said gantry reaching the stopping position and then automatically deenergizing that means after the expiration of an additional time period to permit said one trailer brush to return toward the neutral position prior to expiration of said shutdown time period.

8. A washing device according to claim 1 wherein said latch means includes a laterally extending latch arm mounted for common movement with each of said tractor and trailer brushes between the neutral and retracted positions and having a latching edge;

a ratchet associated with each of said tractor and trailer brushes and located in the travel path of a said latch arm, said ratchet having a plurality of ratchet teeth adapted to receive the latching edge of said latching arm; and means for releasably biasing said ratchet teeth into latching engagement with the latching edge of said latch arm during movement toward a retracted position.

9. A washing device according to claim 8 wherein said ratchet biasing means includes a weight mounted on said ratchet and acting as a gravity bias.

10. A washing device according to claim 8 wherein said release means includes each of said ratchets being mounted for pivotal movement between a latching position wherein said teeth are in latching engagement with said latch arm and a released position wherein said teeth are disengaged from said latch arm; and means for selectively moving said ratchet from the latching position to a released position.

11. A washing device according to claim 10 wherein said means for selectively moving said ratchet from the latching position to a release position includes a fluid-actuated cylinder pivotally connected between said gantry and each of said ratchets having a piston rod for moving the respective ratchet to the release position upon being extended; and release control valve means for selectively introducing a pressurized actuation fluid into one end of each of said cylinders to extend said piston rod.

12. A washing device according to claim 11 including an electrical circuit connected to a source of electrical power and wherein said means for operating said release means includes a switch assembly mounted on said gantry and having an actuation arm extending into the wash bay and adapted to engage said trailer, said actuation arm being movable between a first position to energize said release control valve means for said trailer brushes upon engaging the front of the trailer during rearward movement of said gantry and a second position to energize said release control valve means for said tractor brushes upon disengaging from the trailer during forward movement of said gantry.

* * * * *